June 28, 1927.
C. E. MYERS
1,633,868
SIGNALING DEVICE
Filed Jan. 4, 1922
3 Sheets-Sheet 1
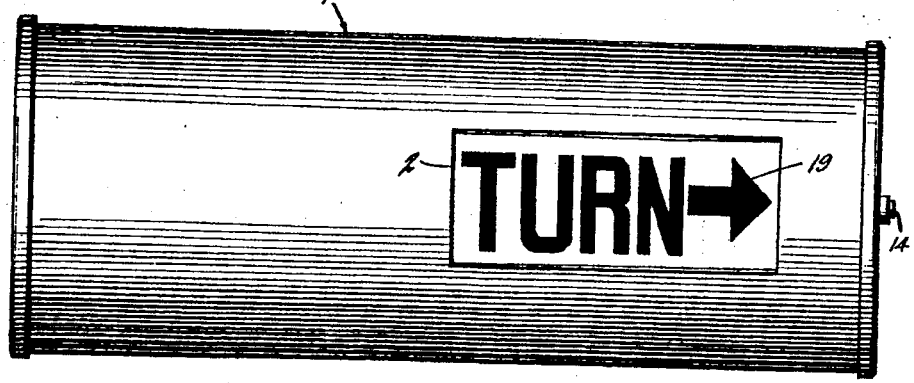
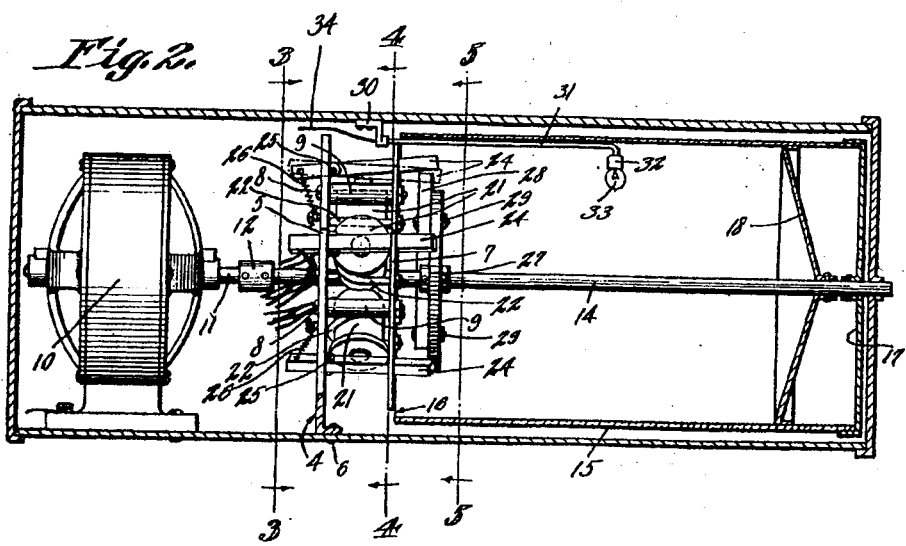
C. E. Myers, Inventor.
By C. A. Snow & Co.
Attorneys.

June 28, 1927.
C. E. MYERS
1,633,868
SIGNALING DEVICE
Filed Jan. 4, 1922
3 Sheets-Sheet 2
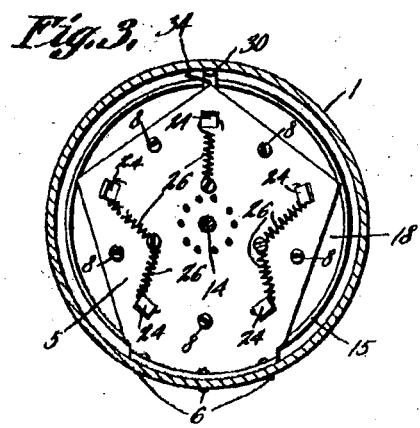
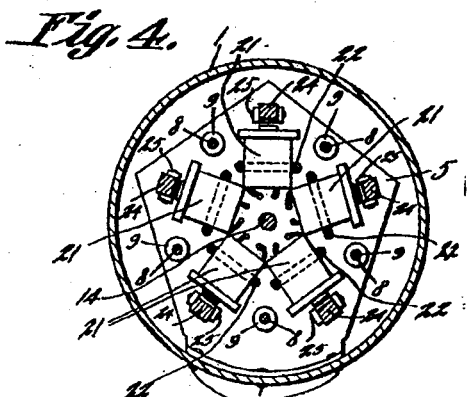
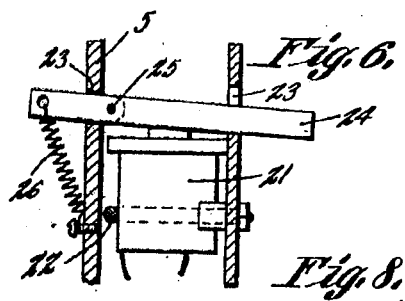
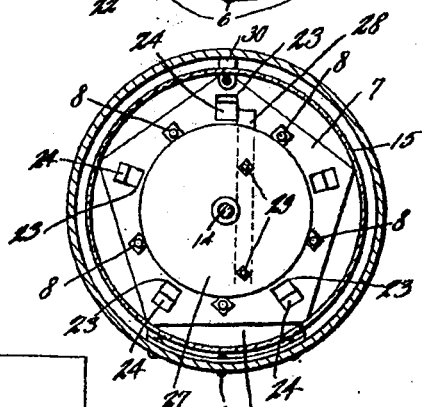
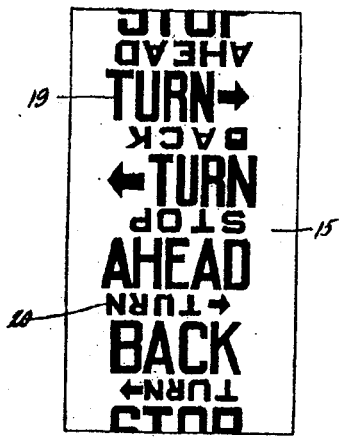
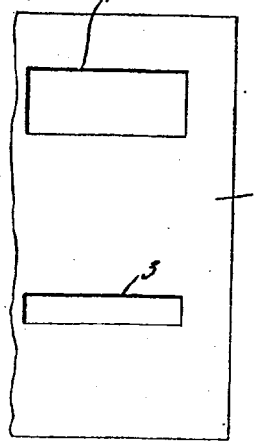
C. E. Myers,
Inventor.

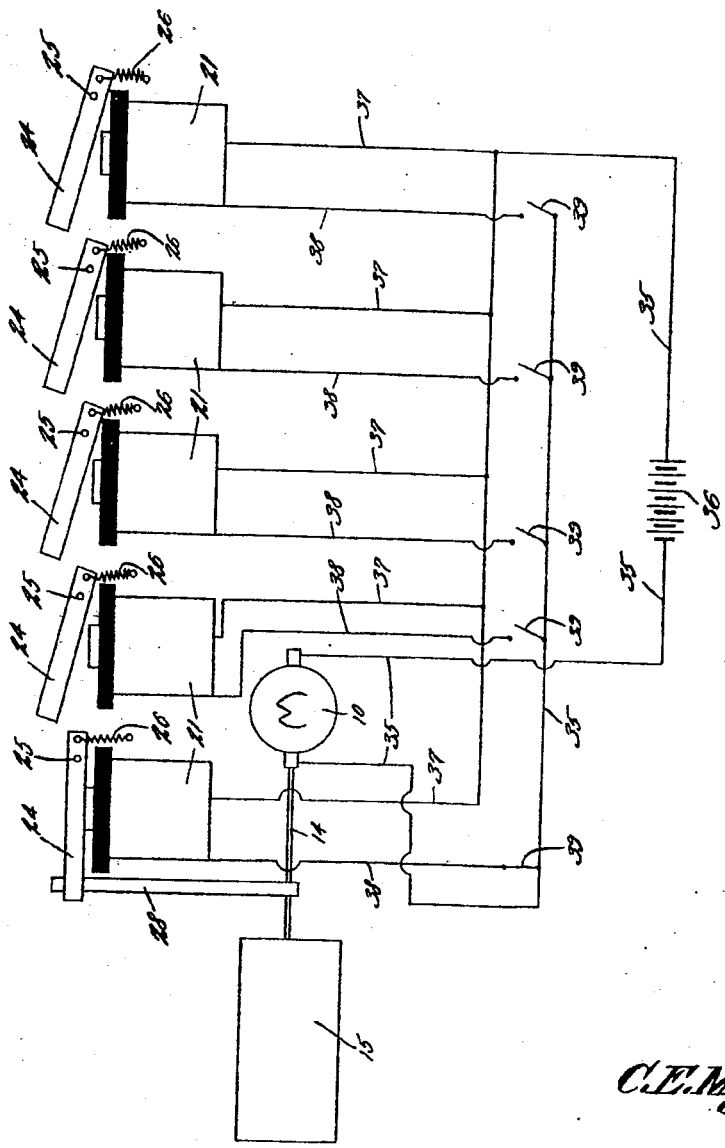

Patented June 28, 1927.

1,633,868

UNITED STATES PATENT OFFICE.

CHARLES E. MYERS, OF VANCOUVER, WASHINGTON.

SIGNALING DEVICE.

Application filed January 4, 1922. Serial No. 526,891.

This invention aims to provide a simple means whereby the driver of a vehicle can transmit signals to pedestrians and to the drivers of other vehicles.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in elevation, a device constructed in accordance with the invention; Figure 2 is a longitudinal section; Figure 3 is a cross section on the line 3—3 of Figure 2; Figure 4 is a cross section on the line 4—4 of Figure 2; Figure 5 is a cross section on the line 5—5 of Figure 2; Figure 6 is a sectional detail illustrating the armature in operative relation to the electromagnet; Fig. 7 is a fragmental plan wherein the signal is shown developed; Figure 8 is a fragmental plan wherein the casing is shown developed; Figure 9 is a diagram illustrating one way in which the device may be wired up.

In carrying out the invention, there is provided a tubular casing 1, adapted to be mounted on the forward end of a vehicle in any suitable way, a similar casing being placed on the rear end of the vehicle. The casing at the front of the vehicle is provided with circumferentially spaced openings 2 and 3, indicated in Figure 8.

Disposed within the casing 1 is a support, denoted generally by the numeral 4, the support comprising a transverse plate 5 secured at 6 to the casing 1, the support including, further a plate 7 disposed parallel to the plate 5 and held thereon by securing elements 8, the securing elements carrying spacers 9 disposed between the plates.

An electric motor 10 is mounted in the casing 1, adjacent to one end thereof, the shaft of the motor being designated by the numeral 11, and being connected by a coupling 12 to a signal shaft 14 journaled in the plates 5 and 7 of the support 4 and in one end of the casing 1.

The numeral 15 designates a tubular signal which is located in the casing 1, the signal being open at one end, as shown at 16 in Figure 2, adjacent to the plate 7 of the support 4. The signal 15 includes a head 17 secured to the shaft 14 and, further the signal may embody a partition 18, likewise mounted on the shaft 14, and serving to retain the signal securely on the shaft. A plurality of legends 19 extend around the signal 15, each legend 19 being duplicated as shown at 20. The legends 19 and 20 are disposed longitudinally of the signal 15. When one of the legends 19 is exposed at the opening 2, to pedestrains and the drivers of approaching vehicles, the corresponding legend 20 is exposed through the opening 3, to the driver of the vehicle on which the signal is located. If the signal is disposed at the rear of the vehicle, the opening 3 may be omitted, since obviously, the driver of the vehicle on which the signal is located, cannot see the opening 3.

Electro-magnets 21 are disposed radially between the plates 5 and 7 of the support 4 and are held on the plate 7 by yokes 22. The plates 5 and 7 have openings 23 through which extend armatures 24, responsive to the electro-magnets 21, the armatures being mounted pivotally, intermediate their ends, on the plate 5, as shown at 25. Retractile springs 26 extend between the armatures 24 and the plate 5 and serve to retract the armatures with respect to the electro-magnets 21, when the electro-magnets are deenergized. A disk 27 is secured to the shaft 14, a projecting stop arm 28 being attached at 29 to the disk.

The casing 1 may carry a bracket 30 supporting a tube 31 extended within the signal 15, the tube being provided with a socket 32 carrying a lamp 33. The conductors 34 for the lamp extend rearwardly through the tube 31.

The structure may be wired up in any desired way, depending upon the taste of the user or the judgment of an electrician. If desired, the motor 10 may be located in a circuit 35, containing a source 36 of electrical energy, the circuit 35 including the windings of the electro-magnets 21, one end 37 of the winding of each magnet being permanently connected to the circuit 35, whereas the other end 38 of the winding of each electro-magnet is connected to the circuit 35 through the instrumentality of a normally open switch 39, which may be in the form of a push button. There is one armature 24 and one electro-magnet 21 for each of the legends 19 on the signal 15, there being one switch or push button for each of the electro-magnets. A glance at Figure 9 will render it evident to those skilled in the art, that any one of the electro-magnets may be energized separately, each time that the motor is put into operation.

When rotation is imparted to the shaft 14 and the signal 15 by the motor 10, the legends 19 appear, one after another, at the opening 2 (Figures 7 and 8), the legends 20 appearing, one after another, at the opening 3, a signal thus being transmitted to pedestrians and to the drivers of approaching vehicles, and the driver of the vehicle on which the signal is located being advised, at the same time, as to the particular legend which is displayed. When any one of the electro-magnets 21 is energized, the corresponding armature 24 is attracted, and caused to swing, on its pivotal mounting 25 against the action of the spring 26, one end of the armature 24 being disposed in the path of the stop arm 28 on the disk 27 of the signal shaft 14. Thus, the rotation of the signal 15 is stopped, thereby disclosing the appropriate legend 19 through the opening 2.

In the building of the device, the electro-magnets 21 rarely can be set correctly at the first trial. Some of the magnets intrude upon others at their inner ends, and divers of the magnets will be set out too far radially of the plate 7. The practice is to place the magnets by eye on the plate 7, set up a little, but not too tightly, on the yokes 22, connect the plate 7 to the plate 8, note the positions of the magnets, detach the plate 7 with all the magnets, tap the magnets in or out radially of the plate 7, tighten up the yokes 22, and connect the plate 7 permanently to the plate 8. The parts, as thus arranged, then may be secured within the casing 1. It is desirable to have all of the electro-magnets 21 located properly with respect to each other and with respect to the armatures 24 before the device is assembled as shown in Fig. 2, because after assembly, the enclosing casing 1, the motor 10 on one side, and the signal 15 on the other, render the magnets highly inaccessible; and since the device is not a high-priced article, it cannot be sold with profit if it has to be set up completely and pulled down several times, for adjustment.

Having thus described the invention, what is claimed is:—

In a device of the class described, a tubular casing, a first transverse plate secured to the casing and located within the casing, a second transverse plate disposed parallel to the first plate, both plates having openings, securing elements connecting the plates and supporting the second plate from the first plate in spaced relation to the casing, a shaft journaled in the plates, electro-magnets located radially with respect to the shaft and disposed between the plates, means for mounting the magnets on the second plate independently of the first plate, armature levers extended through the openings of both plates and fulcrumed intermediate their ends on the first plate, springs located outwardly of the first plate and connecting the ends of the armatures with the first plate, a stop projecting from the shaft, the springs constituting means for holding the opposite ends of the armatures out of the path of the stop, the armatures being mounted to swing radially of the shaft and being responsive to the electro-magnets to dispose the last-specified ends of the armatures in the path of the stop; a signal carried by the shaft, and a motor connected to the shaft, the signal and the motor being located within the casing.

In testimony that I claim the foregoing as my own, I have hereto affixed my signature.

CHARLES E. MYERS.